United States Patent
Kuris

(10) Patent No.: US 10,491,388 B2
(45) Date of Patent: *Nov. 26, 2019

(54) MULTI-LEVEL ENCRYPTION OF TOKENIZED PROTECTED DATA

(71) Applicant: Uber Technologies, Inc., San Francisco, CA (US)

(72) Inventor: Ronald Dana Kuris, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/290,604

(22) Filed: Mar. 1, 2019

(65) Prior Publication Data

US 2019/0199527 A1    Jun. 27, 2019

Related U.S. Application Data

(63) Continuation of application No. 15/271,983, filed on Sep. 21, 2016, now Pat. No. 10,263,776.

(60) Provisional application No. 62/307,434, filed on Mar. 12, 2016.

(51) Int. Cl.
| | |
|---|---|
| G06F 21/60 | (2013.01) |
| H04L 9/14 | (2006.01) |
| H04L 9/08 | (2006.01) |
| G06F 21/62 | (2013.01) |
| G06Q 99/00 | (2006.01) |
| H04L 29/06 | (2006.01) |

(52) U.S. Cl.
CPC ........ *H04L 9/0897* (2013.01); *G06F 21/6227* (2013.01); *G06Q 99/00* (2013.01); *H04L 9/088* (2013.01); *H04L 9/0822* (2013.01); *H04L 63/0428* (2013.01); *G06F 2221/2107* (2013.01); *H04L 2463/062* (2013.01)

(58) Field of Classification Search
CPC ....... G06F 21/60; H04L 63/0428; H04L 9/14; H04L 9/082

See application file for complete search history.

(56) References Cited

U.S. PATENT DOCUMENTS

| | | | |
|---|---|---|---|
| 2002/0038296 A1* | 3/2002 | Margolus | G06F 21/6272 |
| 2015/0318987 A1* | 11/2015 | Kremp | H04L 63/06 380/281 |

OTHER PUBLICATIONS

United States Office Action, U.S. Appl. No. 15/271,983, dated May 31, 2018, nine pages.

* cited by examiner

*Primary Examiner* — Izunna Okeke
(74) *Attorney, Agent, or Firm* — Fenwick & West LLP

(57) ABSTRACT

A system uses a multi-level encryption and tokenization mechanism to allow for fields of a larger object to be individually tokenized and encrypted. Protected data is encrypted using an encryption key and a generated token is displayed in its place. The encryption key is then encrypted using a secondary key. To dereference a token, a requesting application provides the token and associated context to a token service, which searches a token store for a record having both the token and the context. If such a record is located, the token service generates a secondary key and decrypts the encryption key. The decrypted encryption key then decrypts the protected data and transmits the data to the requesting application.

20 Claims, 4 Drawing Sheets

MULTI-LEVEL ENCRYPTION OF TOKENIZED PROTECTED DATA

CROSS REFERENCE TO RELATED APPLICATIONS

This application is a continuation of U.S. application Ser. No. 15/271,983 as filed Sep. 21, 2016, which claims the benefit of U.S. Provisional Application No. 62/307,434, filed Mar. 12, 2016, which is incorporated by reference in its entirety.

TECHNICAL FIELD

The subject matter described herein generally relates to the field of transportation systems, and, more particularly, to a token system that provides a mechanism to protect and store data and documents.

BACKGROUND

Transport management systems provide support for the logistical issues in managing the transportation of persons, cargo, or the like. In some transportation management systems, a driver provides transportation services to a rider to a location selected by the rider; the particular instance of a driver transporting a rider is called a trip. Various information is exchanged between a rider and a driver in the context of a trip. This information includes potentially sensitive details including driver information, passenger information, origin of the trip, destination of the trip, and payment information. Further, this information may be stored in disparate servers that send the data across channels, potentially exposing the data to interception by malicious entities.

Typical encryption mechanisms encrypt all data or all data pertaining to a single trip using a single encryption key. However, these mechanisms are not sufficiently granular to prevent exposure of protected data. In the case of a single encryption key, a malicious entity need only locate one key to access all of the protected data in the transport management system. Even in the case of a trip-specific key, the entity would be able to access all of the protected information about the trip upon decryption of the key.

SUMMARY OF INVENTION

To minimize the risk of exposure of sensitive data to malicious entities, a transportation management system uses a multi-level encryption and tokenization mechanism in which each field of data is protected independent of the other fields such that a breach with respect to one field will not impact other fields of the same object. According to an example, a token service receives a request to create a token that will represent and/or uniquely identify protected data belonging to a user or a device. In conjunction with the request, the token service receives the raw data, token metadata, and context (e.g., a uniformly unique identifier (UUID) of a driver) and provides the received information to a policy module, which returns a cipher, a primary encryption key, storage restrictions, and instructions regarding the applicable token generator. The token generator generates a token based on the instructions provided by the policy module. The token service then encrypts the protected data using the primary encryption key and sends the encrypted data to a protected data store. The primary encryption key itself is then encrypted using a secondary key. The encrypted primary encryption key is stored with the token, along with a salted hash of the context and the storage location of the protected data.

Still further, in some examples, to dereference a token, the requesting party must provide the token and the context associated with the entity to which the data belongs. The token service then applies the salt to the received context and generates a hash of the salted context. Next, the token service searches a token store to identify a record having both the token provided by the requesting party and the hashed context. If such a record is found, the token service generates a secondary key for decrypting the encrypted primary encryption key. Upon decrypting the primary encryption key, the token service retrieves the encrypted data represented by the token and decrypts the data using the key. The decrypted data is then transmitted back to the application that made the decryption request.

The multi-level encryption and tokenization mechanism allows for fields of a larger object to be individually tokenized and encrypted. Each field of data is protected independent of the other fields such that a breach with respect to one field will not impact other fields of the same object. An application can individually dereference one field of a larger object without exposing other fields of the object. Further, tying the decryption of the protected data to the context provides an additional layer of security to the protected data independent of the token. Specifically, the protected data cannot be decrypted unless the requestor provides both the token and the context associated with the entity to which the data belongs.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
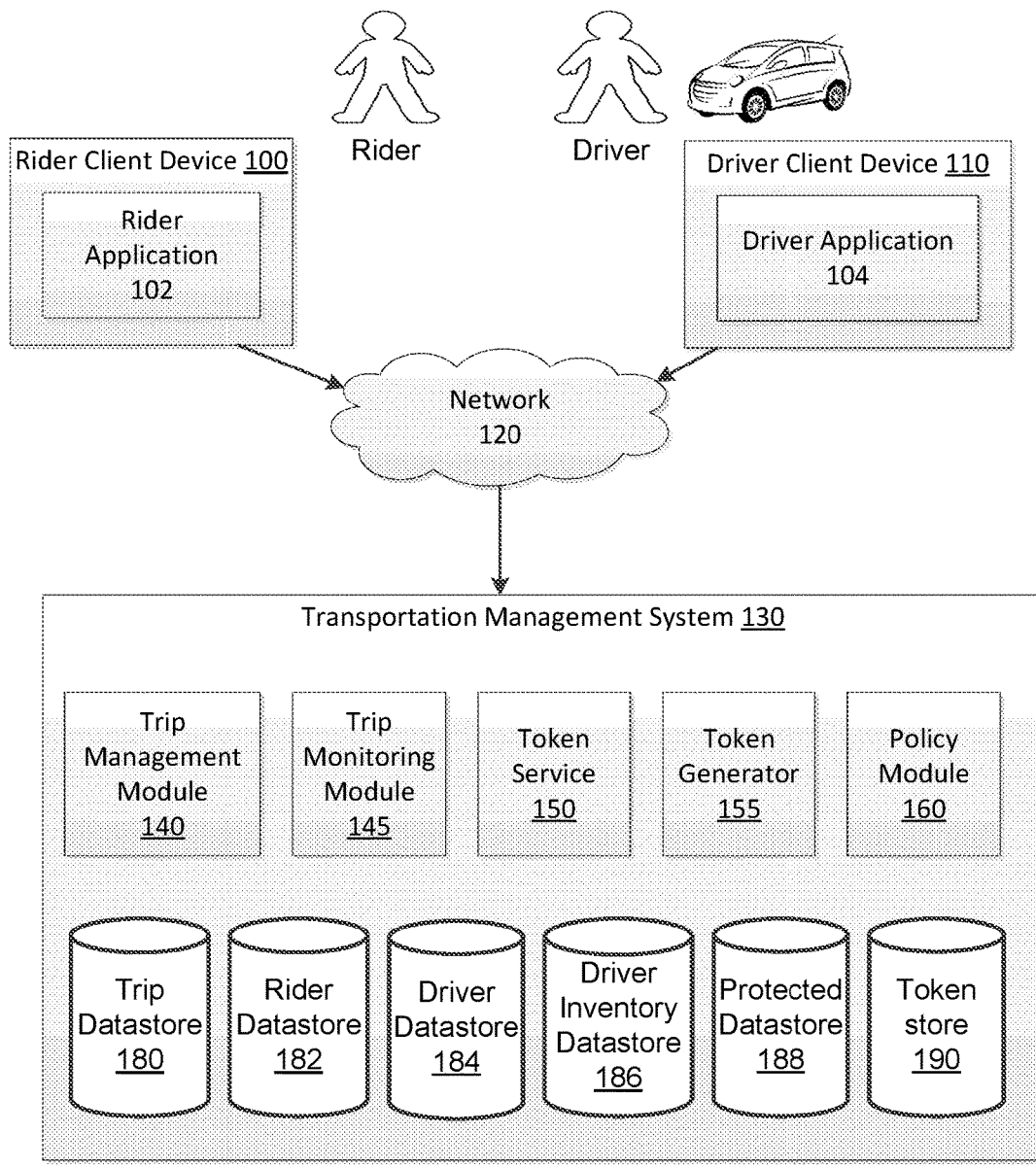
FIG. 1 illustrates the system environment for an example multi-level token encryption system.

Turning now to the specifics of the system architecture, FIG. 1 illustrates the system environment for an example transportation management system 130. The transportation management system 130 coordinates the transportation of persons and/or goods/items for a user ("rider") by a travel provider ("driver"). The driver uses a vehicle to provide the transportation to the rider. In this example embodiment, the transportation management system 130 includes a trip management module 140, a trip monitoring module 145, a token service 150, a token generator 155, a policy module 160, and various data stores including a trip data store 180, a rider data store 182, a driver data store 184, a driver inventory data store 186, a protected data store 188, and a token store 190. These modules and data stores are not native components of a generic computer system, and provide structures and functions beyond generic functions of a computer system, as further described below.

A rider operates a client device 100 that executes a rider application 102 that communicates with the transportation management system 130. The rider operates the client application 102 to make a trip request from the transportation management system 130 for a delivery or transport service ("a trip") of the rider (and, optionally, additional persons) and/or items, for example cargo needing transport. The rider client application 102 enables the rider to specify an origin location and/or a destination location associated with the trip. An origin location or a destination location may be a location inputted by the user or may correspond to the current location of the client device 100 as determined automatically by a location determination module (not shown) in the client device 100, e.g., a GPS system, a wireless networking system, or a combination thereof.

The rider client application 102 transmits a trip request initiated by a user to the transportation management system 130 over the network(s) 120. The trip request identifies the rider and at least the origin location specified by the rider. The transportation management system 130 uses information from the trip request to match the rider with one of a plurality of available drivers. The transportation management system 130 selects a driver, such as based on the driver's current location and/or information from the trip request (e.g., vehicle type, origin location, and/or destination location), to provide the trip for the rider and transport the rider from the origin location to the desired destination location. The rider client application 102 further enables a rider to provide a performance rating for a driver upon completion of a trip. In one embodiment, the rating is provided on a scale of one to five, five being the maximal (best) rating.

The driver operates a client device 110 executing a driver application 104 that communicates with the transportation management system 130 to provide information indicating whether the driver is available or unavailable to provide transportation services to riders. In one embodiment, the driver application 104 enables the driver to provide information regarding availability of the driver by logging into the transportation management system 130 and activating a setting indicating that they are currently available to provide trips. The driver application 104 also provides the current location of the driver or the client device 110 to the transportation management system 130. Depending on implementation, the current location may be a location inputted by the driver or may correspond to the current location of the client device 110 as determined automatically by a location determination module (not shown) in the client device 110, e.g., a GPS system, a wireless networking system, or a combination thereof. The driver application 104 further allows a driver to receive, from the trip management module 140, an invitation message to provide a trip for a requesting rider, and if the driver accepts, the driver application 104 can transmit an acceptance message to the trip management module 140. The trip management module 140 can subsequently provide information about the driver to the rider's client application 102. As another embodiment, the driver application 104 can enable the driver to view a list of current trip requests and to select a particular trip request to fulfill. The driver application 104 can also receive routing information from trip management module 140. The driver application 104 enables a driver to provide a rating for a rider upon completion of a trip. In one embodiment, the rating is provided on a scale of one to five, five being the maximal (best) rating.

The rider client device 100 and driver client device 110 are portable electronic devices such as smartphones, tablet devices, wearable computing devices (e.g., smartwatches) or similar devices. Alternatively, the driver client device 110 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities.

The trip management module 140 is configured as a communicative interface between the rider application 102, the driver application 104, and the various modules and data stores in the transportation management system 130, and is one means for performing this function. The trip management module 140 is configured to receive driver availability status information and current location information from the driver application 104 and update the driver inventory data store 186 with the availability status. The trip management module 140 is also configured to receive trip requests from the rider application 102 and creates corresponding trip records in the trip data store 180. A trip record corresponding to a trip request has a trip ID, a rider ID, an origin location, a destination location, and a status indicating that the corresponding trip request has not been processed. According to one example, when a driver accepts the trip request for the rider, the trip record can be updated with the driver's information as well as the driver's location and the time when the trip request was accepted.

In one embodiment, during the trip, the trip monitoring module 145 receives information from the driver application 104 indicating the location of the driver's vehicle and/or telematics information (e.g., indications of current speed, acceleration/deceleration, events, stops, and so forth). The trip monitoring module 145 stores deviations from the rider-selected routing option in the trip record stored in the trip data store 180. These deviations may factor into the driver's performance ratings over time.

The token service 150 receives a request from a requesting application to create a token that will uniquely identify protected data belonging to a user or device. Each request is associated with a requesting UUID. In conjunction with the request, the token service receives the protected data, the context, and token metadata. The metadata may optionally include the home city for the protected data (e.g., "city_id": 123) and/or the token type (e.g., "type": "driver doc"). The context is associated with the entity that owns the protected data. The context, for example, may be a UUID of a user of the system or a particular transaction within the system. In a ride-sharing system, for example, the context may be the UUID of the rider (or other data associated with the rider, such as a device identifier of the rider's client device), the UUID of the driver, or a trip identifier associated with a given trip requested and/or taken by a rider (or other data associated with a trip entry, such as a vehicle type, a pickup location, a destination, etc.). In one embodiment, the context is used as a security mechanism when accessing the protected data represented by the token. The token service 150 sends the context, token metadata, the requesting application, and the requesting UUID to the policy module 160 for generation of a cipher and a primary encryption key.

The token service 150 also encrypts the protected data responsive to receiving a token generated by the token generator 155 and sends the encrypted protected data to the protected data store 188 for storage. After sending the encrypted data to the protected data store 188, the token service 150 also encrypts the primary encryption key using a secondary key generated from the context, the token, and a master key. The token service 150 then salts and hashes the context before sending the token, the encrypted primary encryption key, and the hashed context to the token store 190 for storage.

Responsive to receiving a decryption request, the token service 150 dereferences existing tokens and accesses protected data. The requesting application provides the token service 150 with the token and the context used when creating the token (e.g., the driver UUID). The token service 150 applies the salt to the received context and generates a hash of the salted context. In one embodiment, the context is encrypted using a hashing algorithm such as SHA-224. The token service 150 then searches the token store 190 to identify a record having both the token and the hashed context. If such a record is found, the token service 150 generates a secondary key for decrypting the primary encryption key. Upon decrypting the primary encryption key, the token service 150 retrieves the encrypted data represented by the token from the protected data store 180 and decrypts the data using the primary encryption key. The token service 150 then transmits the decrypted data back to the requesting application.

In some embodiments, the token service 150 also performs aggregation operations without exposing the protected data. In a ride-sharing system, for example, an application may request an aggregated count of all of the trips that are associated with a token representing a given user name. The token need not be dereferenced and, further, any specific information related to the individual trips need not be exposed (or dereferenced if those are also tokenized) to generate the aggregate count. Similarly, for a location-based aggregation, an application may request an aggregated count of all of the trips that originated from a token representing a particular address.

The token generator 155 generates a token based on the token instructions provided by the policy module 160. The token is a string that represents the protected data and is unique in association with a given context. In one embodiment, a token is displayed in place of the actual data. For example, in a ride-sharing system, a driver might be required to provide the customer service representative with the driver's email address. The customer service representative may compare the obscured data in a token with the email address provided by the driver.

In one embodiment, the token is opaque. For example, a token might be a Type 4 globally unique identifier (GUID) (e.g., 122 bits of randomness), which is completely opaque. In another embodiment, the token might be semi-opaque and obscure some portions of the data, such as r***@u**.com representing an email address. In some examples, the token may be consistently recreated from the protected data such as by applying a known, constant function to the protected data. Alternatively, the token may not be reliably recreated from the protected data, such as by a randomized token generation function or by a function that uses the protected data but includes a randomization function.

A token can also have a token type that loosely describes the contents of the protected data and the format of the token that is generated. For example, in one embodiment, a token type is "email address" and the associated format is ***@**.

The policy module 160 receives the context, the token metadata, the requesting application, and the requesting UUID from the token service 150 and responds with the cipher to use, the primary encryption key, storage restrictions, and the token generator to use. The primary encryption key may be randomly generated and/or unique to the data to be encrypted. In one embodiment, the policy module 160 selects the AES-256 cipher with a random key. In other embodiments, other types of ciphers and keys are selected. As a result, each piece of personal data stored in the protected data store 188 is encrypted with a different key.

The policy module 160 is a code module that determines how and where to store data as well as how to create the tokens. In one embodiment, the selection of the applicable policy is based on the type of protected data. The policy module 160 is responsible for deciding and communicating to the token service 150 the encryption cipher and primary encryption key, the token generation algorithm, and the storage restrictions for the protected data. In one embodiment, the decisions are based on the available metadata associated with the protected data. The policy module 160 will reject the creation of a token for protected data if the metadata is not sufficiently described.

The trip data store 180 maintains a record of each in-progress and completed trip coordinated by the transportation management system 130. More specifically, each trip provided by a driver to a rider is characterized by a set of attributes (or variables), which together form a trip record that is stored in the trip data store 180. The attributes describe aspects of the driver, the rider, and the trip. In one embodiment, each trip record includes a trip identifier (ID), a rider ID, a driver ID, the origin location, the destination location, the duration of the trip, the service type for the trip, estimated time of pick up, actual time of pickup, and driver rating by rider, rider rating by driver, fare information, market information, and/or other environmental variables as described below. The variables for the trip record are thus drawn from multiple sources, including the rider's master and usage records in the rider data store 182, the driver's master and operational records in the driver data store 184, and specific variables captured and received during each trip.

A trip record in the trip data store 180 may optionally include additional variables that relate to the characteristics of the specific trip, the behavior of the driver, or experimental variables. For example, the trip record may include telematics information, for example maximal acceleration amounts by the vehicle, the number of times the driver deviated from a designated route by missing a turn or an exit, the number of times the driver stopped, the number of times the driver exceeded a posted speed limit, and so forth. The trip record may also include variables indicating messages that the driver or the rider received in connection with the trip as well as responses to questions presented to the rider or the driver.

In one embodiment, the trip data store 180 contains one or more of the following variables for each trip:

TABLE 1

Trip Record Variables

| Variable Name | Description |
| --- | --- |
| Trip ID | Identifier of the specific trip |
| RiderID | Identifier of the rider |
| DriverID | Identifier of the driver |
| Status | Current status of trip (pending, in-progress, completed, etc.) |
| Vehicle Type | Type of driver's vehicle (e.g. coupe, sedan, SUV, minivan, limo, etc.) |
| Vehicle Age | Age of driver's vehicle in years |
| City | City of service |
| Date/time | The date and time that the trip was requested. |
| RiderEmployee? | Whether the rider is an employee of the provider of the transportation management system 130. |
| Service type | The class of service provided by the driver such as standard, pool, luxury, van, and the like. |
| Estimated Time of Arrival and | The estimated time of arrival is an estimate of the amount of time (in seconds) that it should take for the driver to reach the rider's origin location given the current location of the driver at the time the driver selected the trip request for the rider. |
| Actual Time of Arrival | The Actual Time of Arrival is the actual amount of time it, in fact, took as determined from either an input received from the driver application that the driver has picked up the rider or a comparison of the location of driver's vehicle to the origin location. |
| ExtraETATime | The Extra ETA Time is a calculation of the extra time taken to reach the origin location relative to the estimate. e.g.: Extra ETA Time = (Actual Time of Arrival − Estimate Time of Arrival)/Estimated Time of Arrival. In this formulation larger positive values are indicative of increasing wait times for the rider; larger negative values are indicative of the driver arriving earlier than estimated. |
| Trip Distance | The actual distance of the completed trip. |
| Trip Duration | The actual amount of time for the completed trip as measured from the time of rider pickup to the time the driver indicates that the trip is completed |
| Trip Average Speed | Trip distance divided by trip duration |
| Surge Pricing | A multiplier (>1.0) applied during peak demand times |
| Fare | The amount charged for the trip. |
| Payment Credit | An indicator as to whether the fare was paid for with promotional or other types of credits. |
| Estimated Trip Duration | An estimate of the amount of time for the trip. |
| Extra Trip Time | The Extra Trip Time is a calculation of the extra time taken to reach the destination location relative to the estimated trip duration e.g.: Extra Trip Time = (Actual Trip Duration − Estimated Trip Duration)/Estimated Trip Duration. |
| Congestion Estimate | An estimate of the excess time associated with traveling the selected route for the trip due to traffic impact. This value may be computed as the ratio (timeActual/timeOptimal) − 1. |
| Number of Trip Reroutings | For the driver, the average number of times per trip that a supplied route for the trip had to be rerouted as a result of the driving missing an expected turn or exit. |
| Maximum Lateral Acceleration | Maximum readings of acceleration as measured by the driver's device 110. |
| Maximum Deceleration | Maximum reading of deceleration (braking) as measured by the driver's device 110. |
| Waiting Time by Driver | Time between the driver's arrival at the origin location and the time the trip started as indicated by the driver. |
| DriverMessageList | List of message IDs or other identifiers of messages provided to the driver's client application 104 |
| RiderMessageList | List of message IDs or other identifiers of messages provided to the rider client application 102 |
| DriverResponseList | List of responses (by ID or text values) received from the driver's client application 104 in response to question messages. |
| RiderResponseList | List of responses (by ID or text values) received from the rider's client application 102 in response to question messages. |
| Rider Rating | The rating of the rider by the driver. |
| Driver Performance Rating | The performance rating of the driver by the rider. The rating can be expressed in a scale (e.g., 1-5, where 5 is a maximal rating), positive/negative scale (e.g., "thumbs up/thumbs down"). |

The rider data store 182 stores account and usage information for each rider who is a user of the system. For each rider, the rider data store 182 stores one or more database records associated with the rider, including both master data and usage data. In some examples, master data for a rider includes the rider's name, address information, cell phone number, payment information (e.g., credit card number), sign up date, rider acquisition type (e.g., referral, promotional code, employee), device type (e.g., type of cell phone), platform type (e.g., iOS, Android), application ID, and/or application version for the rider application 102. Usage data includes variables that characterize the rider's usage over the trips that the rider has taken using the system. These variables include at least one or more of the following:

includes the driver's name, driver's license information, insurance information, vehicle information (year, make, model, vehicle ID, license plate), address information, cell phone number, payment information (e.g., credit card number), sign-up date, driver service type (regular, luxury, van, etc.), device type (e.g., type of cell phone), platform type

TABLE 2

Rider Usage Variables

| Variable Name | Description |
|---|---|
| Number of trips | Total number of trips made by the rider. Further variations of this variable include such as the number of rides in the past 24 hours, past seven days, past month, etc. |
| Time Since Last Trip | Amount of time since the last trip by the rider. |
| Frequency of Cancelation by Rider | The percent of trip requests that the rider has canceled (e.g., number of cancelations/number of requests). |
| Frequency of Contact with Driver | The percent of times that the rider has contacted the driver (either by text or by calling) prior to being picked up by the driver e.g. number of contacts/number of trips. |
| Average Driver Rating | The average of the performance ratings given by the rider to the drivers. |
| Average Rider Rating | The average of the ratings given to the rider by the drivers of trips taken by the rider. |
| Frequency of Non-Satisfactory Rating of the Driver | The proportion of ratings given by the rider to drivers that are not satisfactory performance ratings. This is the number of times a non-satisfactory was given by the rider to a driver divided by the total number of ratings by the rider. The threshold for satisfactory ratings is a parameter set in the transportation management system 130, and may be a maximal value (e.g., 5 on a 1-5 scale) or a non-maximal value (e.g., equal to or greater than 4.00 on a 5 scale). |
| Frequency of Non-Satisfactory Rating of the Rider | The proportion of ratings given by the drivers to the rider that are not satisfactory performance ratings. Thus, in this embodiment, it would be the number of times non-satisfactory was given by drivers to the rider divided by the total number of ratings made by drivers. |
| Number of Hours Since Last Non-Satisfactory Rating of a Driver | The number of hours that have passed since the last time the rider gave a non-satisfactory rating to a driver. |
| Routing Preferences | Preference for highways, scenic routes, routes that minimize cost, routes that minimize time. These preferences may be explicitly provided by the rider or may be learned over the rider's usage over the trips that the rider has taken using the system. |

The driver data store 184 stores account and operational information for each driver who participates in the transportation management system 130. For each driver, the driver data store 184 stores one or more database records associated with the driver, including both master data and usage data. In some examples, master data for a driver (e.g., iOS, Android), application ID, and/or application version for the driver application 104. Operational variables include variables that objectively characterize the driver's operation of the trips that the driver has provided using the system. These variables include at least one or more of the following:

TABLE 3

Driver Operational Variables

| Variable Name | Description |
|---|---|
| Number of Trips by Driver | Total number of trips provided by the driver. |
| Number of Trips by Driver 4 Hour | Number of trips by made the driver in the past four hours. Other variations include number of trips in past 24 hours past week past month etc. |
| Time since shift start | Number of hours that the driver has been active in this shift. |
| Number of Hours Since Last Non-Satisfactory Rating of the Driver | The number of hours that have elapsed since the driver received a non-satisfactory rating from a rider. |
| Frequency of Cancelation by Driver | The percent of trip requests that the driver has canceled (e.g., number of cancelations/number of requests accepted by the driver. |
| Average Driver Rating | The average of the performance ratings given to the driver by riders. |
| Average Driver Rating | The average of the ratings given by the driver to riders in trips provided by the driver. |

TABLE 3-continued

Driver Operational Variables

| Variable Name | Description |
| --- | --- |
| Frequency of Non-Satisfactory Rating of the Driver | The proportion of ratings given to the driver by riders that are not satisfactory performance ratings. Thus, in this embodiment, it would be the number of times a rating of less than 5 was given to the driver to by a rider divided by the total number of ratings by the driver. |
| Frequency of Non-Satisfactory Rating of the Rider | The proportion of ratings given by the driver to the riders that are not satisfactory ratings. Thus, in this embodiment, it would be the number of times a rating of less than 5 was given by the driver divided by the total number of ratings made by the driver. |
| Number of Hours Since Last Non-Satisfactory Rating of a Rider | The number of hours that have passed since the last time the driver give a non-satisfactory rating to a rider. |
| Number of Complaints against Driver | Number of complaints made by riders with respect to the driver. |

Additional variables may also be developed for either the rider or the driver, for example, the probability of the rider traveling during particular periods and the probability of a driver being available during such periods. Any of the foregoing variables may be weighted with respect to time so that more recent trips are weighted more heavily in any computation of the metric over older trips to provide a greater reflection of the rider's or the driver's current behavior given that behavior and expectations can change over time.

The driver inventory data store 186 stores driver availability status information received from the trip management module 140, including whether the driver is available for matching and the location of the driver (which gets updated periodically). When the trip management module 140 receives a trip request, the trip management module 140 determines, from the driver inventory data store 186, which drivers are potential candidates to pick up the rider for the newly created trip. When the transportation management system 130 marks a trip record as complete, the transportation management system 130 can add the driver back into the inventory of available drivers in the driver inventory data store 186.

The protected data store 188 stores the encrypted protected data based on the applicable policy selected by the policy module 160. The protected data represented by a token is stored according to localized policies independent of how the token is stored. In some embodiments, authorization mechanisms are applied once the encrypted protected data is sent to the protected data store 188. For example, certain classes of employees may be programmatically prohibited from reading certain token types. Additionally or alternatively, if a hold is placed on personal data, the token service 150 could prevent deletion of data based on the context and data type. In still another embodiment, if a customer requests the deletion of her personal data, the token service 150 could enforce a rule that prevents access based on context.

The token store 190 is responsible for storing the generated tokens along with a salted hash of the context, the encrypted primary encryption key, and the storage location within the protected data store 188 where the protected data is located. In some embodiments, additional metadata about the protected data is stored in the token store 190 and is used for later token analysis. Examples of such metadata include: the UUID that created the document, a creation timestamp, the token type, and the application identifier that created the document.

Figure 2:
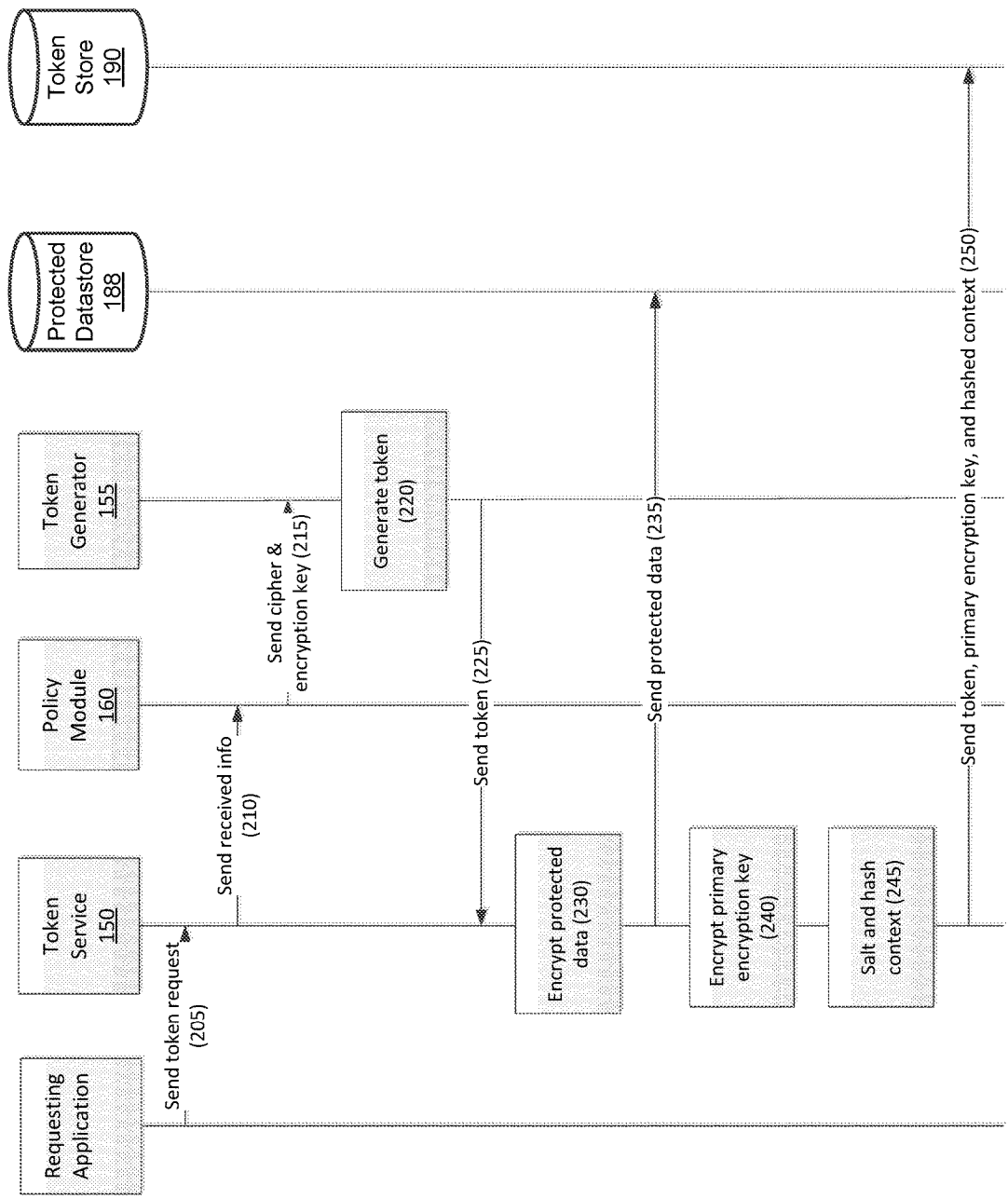
FIG. 2 illustrates an interaction diagram for encrypting protected data using the system of FIG. 1.

FIG. 2 illustrates an interaction diagram for creating a token that represents protected data in response to a request by a requesting application.

At 205, the requesting application sends a token creation request to the token service 150. In conjunction with the request, the requesting application provides to the token service 150 the associated context (e.g., a driver UUID), token metadata, and the protected data. In response, at 210, the token service 150 sends the request and associated information, along with the requesting application and requesting UUID, to the policy module 160.

At 215, the policy module 160 responds by selecting and providing to the token generator 155 a cipher, a primary encryption key, storage restrictions for storage of the protected data, and the token generator to use. The primary encryption key may be randomly generated and/or unique to the data to be encrypted. At 220, the token generator 155 generates a token based on the received instructions. The token may be opaque or semi-opaque and may have a token type that broadly describes the contents of the protected data and the token format.

After generating the token, the token generator 155 sends 225 the token to the token service 150. At 230, the token service 150 encrypts the protected data using the primary encryption key and sends 235 the protected data to the protected data store 188 based on the storage restrictions provided by the policy module 160.

At 240, the token service 150 encrypts the primary encryption key using a secondary encryption key generated from the context, the token, and the master key. The token service 150 then salts and hashes 245 the context and sends 250 the token, the encrypted primary encryption key, and the hashed context to the token store 190 for storage. Once the token is generated, it is displayed in place of the protected data.

Figure 3:
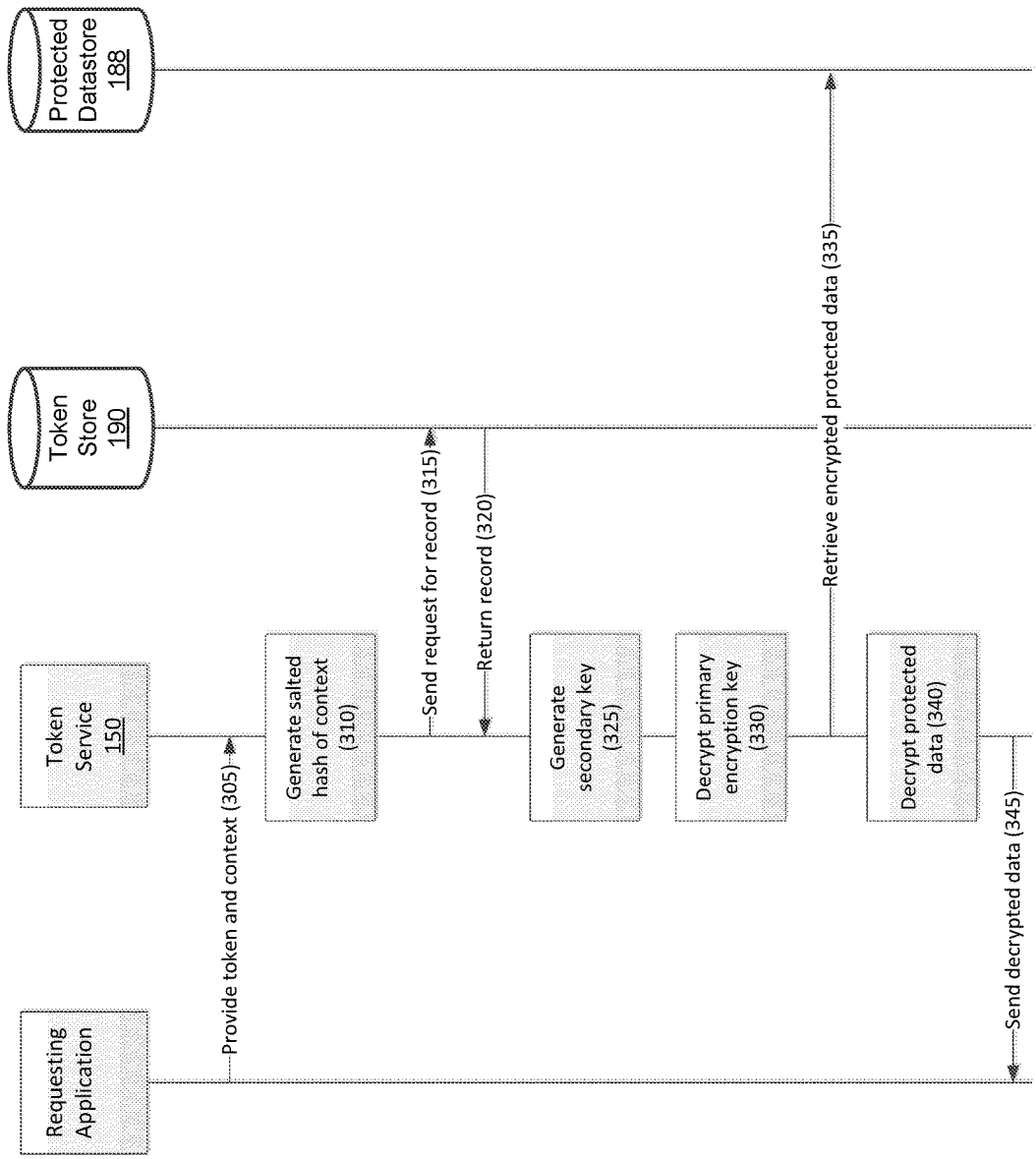
FIG. 3 illustrates an interaction diagram for dereferencing tokenized protected data using the system of FIG. 1.

FIG. 3 illustrates an interaction diagram for dereferencing a token to access the represented protected data. At 305, the requesting application provides the token and the context associated with the entity to the token service 150. Requiring the requesting application to provide the context reduces the number of display errors where protected data is displayed to the wrong user. At 310, the token service 150 applies the salt to the received context and generates a salted hash of the context.

At 315, the token service 150 sends a request to the token store 190 for a record containing both the token provided by the requesting application and the hashed context. If either the context or the token is incorrect, the record will not be found. The token store 190 returns 320 the requested record, and responsive to receiving the record, the token service 150 generates 325 a secondary key comprised of at least the context and the token. At 330, the token service 150 uses the secondary encryption key to decrypt the primary encryption key and retrieves 335 the encrypted protected data from the protected data store 188.

At 340, the token service 340 decrypts the protected data using the primary encryption key and transmits 345 the decrypted data to the requesting application. In some embodiments, when a token is dereferenced, the token service 150 creates an auditable record that stores, among other information, who accessed the record and when it was accessed.

Additionally or alternatively, a token may be deleted. To delete a token and its associated metadata, a requestor provides the token and the context to the token service 150. Applications may request to delete tokens when they have determined that they have no use for the protected data associated with the token. The token service 150 may defer or refuse to delete the token and associated encrypted protected data. For example, the tokens may still exist in some log files, or may not be suitable to delete for business or policy reasons.

Figure 4:
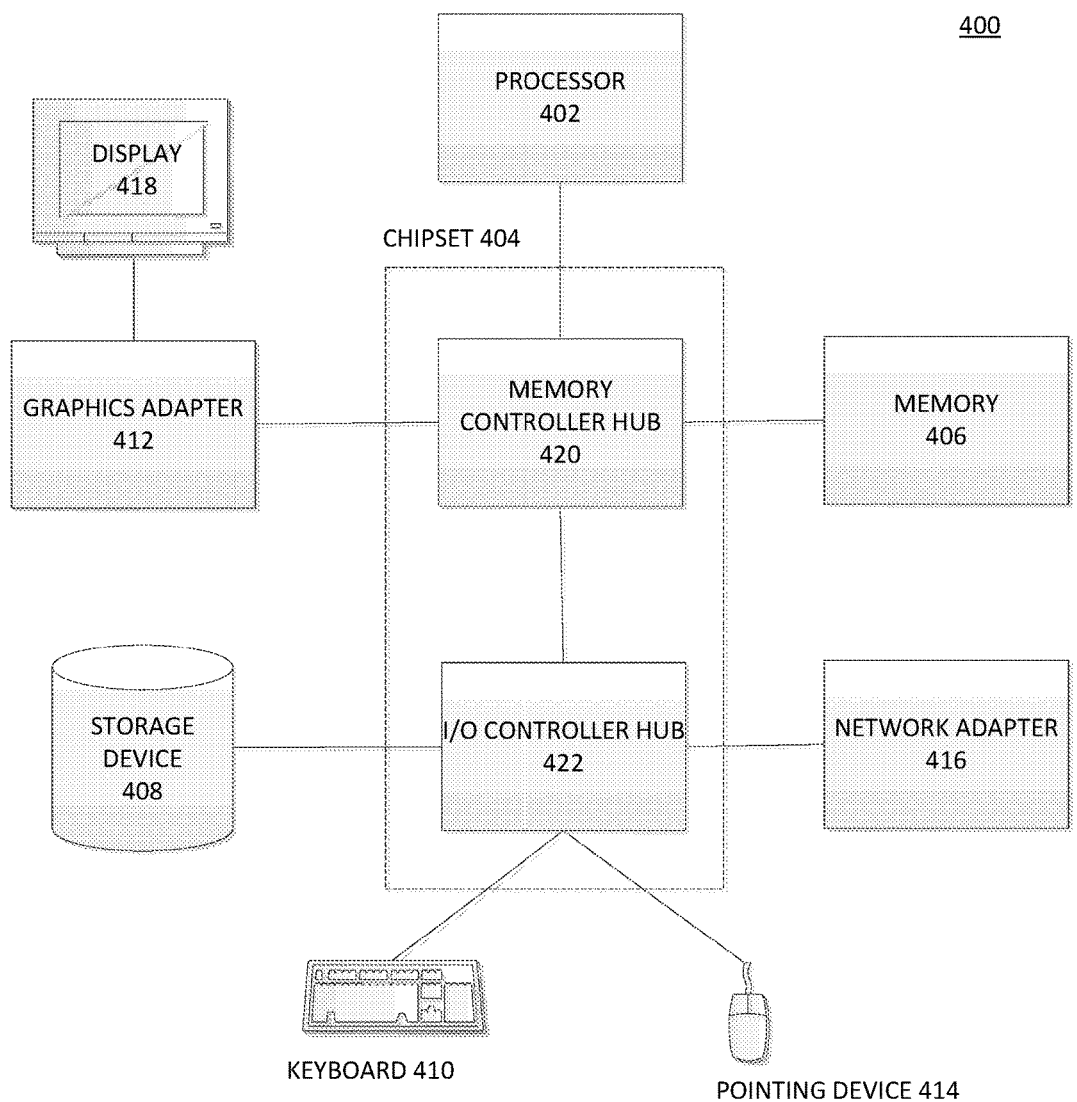
FIG. 4 illustrates physical components of a computer used as part or all of the transportation management system, the rider client device, and/or the driver client device.

FIG. 4 is a high-level block diagram illustrating physical components of a computer 500 used as part or all of the transportation management system 130, rider client device 100, or driver client device 110 from FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400, such as a host or smartphone, may lack a graphics adapter 412, and/or display 418, as well as a keyboard 410 or external pointing device 414. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore it has also proven convenient at times to refer to these arrangements of operations as modules without loss of generality. The described operations and their associated modules may be embodied in software firmware hardware or any combinations thereof.

Any of the steps operations or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly the disclosure of the embodiments of the invention is intended to be illustrative but not limiting of the scope of the invention which is set forth in the following claims.

The invention claimed is:

1. A method for encrypting and storing data, comprising:
receiving, at a computing system, from a computing device associated with a user of the computing system, a request to encrypt a plurality of units of data, each unit of data associated with a context describing a feature of a transaction facilitated by the computing system;

for each unit of data:
  generating a tokenized representation of the unit of data, the tokenized representation uniquely identifying the unit of data;
  encrypting the unit of data using a first encryption key uniquely generated for the unit of data;
  storing the encrypted unit of data in a protected data store;
  encrypting the first encryption key with a second encryption key, the second encryption key generated based at least on the tokenized representation and the context associated with the unit of data; and
  storing the tokenized representation and the encrypted first encryption key in a token store, the token store being physically separate from the protected data store.

2. The method of claim 1, wherein generating the tokenized representation further comprises:
  receiving a request to generate a token;
  receiving, as input, the unit of data, associated context, and token metadata; and
  sending the input to a policy module for selection of the key, a cipher, and storage restrictions for storing the encrypted unit of data.

3. The method of claim 1, wherein the context is associated with an entity that owns the unit of data.

4. The method of claim 1, further comprising:
  salting and hashing the context; and
  storing the hashed context in the token store.

5. The method of claim 1, wherein the tokenized representation is opaque.

6. The method of claim 1, wherein the tokenized representation is semi-opaque.

7. The method of claim 1, wherein the tokenized representation has a token type that describes contents of the unit of data and a format of the tokenized representation.

8. The method of claim 1, further comprising applying authorization mechanisms for the encrypted unit of data.

9. A method for accessing protected data, comprising:
  receiving, at a computing system, from a computing device associated with a user of the computing system, a request for dereferencing a tokenized representation of a unit of data of a plurality of units of data that is encrypted and stored in a protected data store, the request including the tokenized representation and a context associated with an entity to which the unit of data belongs, the context describing a feature of a transaction facilitated by the computing system;
  identifying a first encryption key stored in a token store that was used to encrypt the unit of data;
  generating a second encryption key based at least on the tokenized representation and the context;
  decrypting the first encryption key using the generated second encryption key;
  decrypting the unit of data stored in the protected data store using the decrypted first encryption key; and
  transmitting the decrypted unit of data to a requesting application.

10. The method of claim 9, further comprising generating a salted hash of the context.

11. The method of claim 9, wherein the tokenized representation is opaque.

12. The method of claim 9, wherein the tokenized representation is semi-opaque.

13. The method of claim 9, wherein the tokenized representation has a token type that describes contents of the unit of data and a format of the tokenized representation.

14. A non-transitory computer-readable storage medium storing computer-executable instructions that, in response to executing, cause a device comprising a processor to perform operations, comprising:
  receiving, at a computing system, from a computing device associated with a user of the computing system, a request to encrypt a plurality of units of data, each unit of data associated with a context describing a feature of a transaction facilitated by the computing system;
  for each unit of data:
    generating a tokenized representation of the unit of data, the tokenized representation uniquely identifying the unit of data;
    encrypting the unit of data using a first encryption key uniquely generated for the unit of data;
    storing the encrypted unit of data in a protected data store;
    encrypting the first encryption key with a second encryption key, the second encryption key generated based at least on the tokenized representation and the context associated with the unit of data; and
    storing the tokenized representation and the encrypted first encryption key in a token store, the token store being physically separate from the protected data store.

15. The computer-readable medium of claim 14, wherein generating the tokenized representation further comprises:
  receiving a request to generate a token;
  receiving, as input, the unit of data, associated context, and token metadata; and
  sending the input to a policy module for selection of the key, a cipher, and storage restrictions for storing the encrypted unit of data.

16. The computer-readable medium of claim 14, wherein the context is associated with an entity that owns the unit of data.

17. The computer-readable medium of claim 14, wherein the instructions further comprise instructions for:
  salting and hashing the context; and
  storing the hashed context in the token store.

18. The computer-readable medium of claim 14, wherein the tokenized representation is opaque.

19. The computer-readable medium of claim 14, wherein the tokenized representation is semi-opaque.

20. The computer-readable medium of claim 14, wherein the tokenized representation has a token type that describes contents of the unit of data and a format of the tokenized representation.

* * * * *